3,227,519
METAL PHOSPHATES AND METHODS FOR
PRODUCING SAME
Gordon J. Turner, Baltimore, and Casimer C. Legal, Jr., Elkridge, Md., assignors to W. R. Grace & Co., New York, N.Y., a corporation of Connecticut
No Drawing. Filed Apr. 12, 1962, Ser. No. 186,868
2 Claims. (Cl. 23—105)

This invention relates to metal phosphates and to methods for their production. In one particular embodiment the invention relates to a method for recovering aluminum phosphate from certain minerals and ores containing the same. Another embodiment of the invention relates to a new crystalline form of aluminum phosphate and to methods for preparing the same, while still another embodiment relates to new aluminum phosphate gels and methods for their preparation.

There is known to be a series of naturally occurring aluminum phosphate minerals. Certain of these minerals, containing varying amounts of aluminum phosphate and ferric phosphate, are commonly classified as the variscite strengite series of aluminum phosphate ores. Such ores include various varicites, ferrian-variscites, and aluminum strengites [see generally Dana's System of Mineralogy, 7th edition, vol. 2, pp. 756–57 (second printing, 1957)]. Proposals have previously been made for recovering the aluminum and phosphorus content of such minerals and ores as aluminum hydroxide and sodium phosphate by treatment with caustic alkalis followed by selective precipitation. Insofar as known, no successful method has been devised for recovering aluminum phosphate, as such, from these ores. In view of the increasing consumption of aluminum phosphate for its known uses in glass and ceramics, in the laminating and bonding industries, and as a catalyst for various reactions; as well as the increasing interest in the use of aluminum phosphate as a catalyst in new reaction systems; it has now become desirable to be able to recover aluminum phosphate from naturally occurring ores and minerals containing the same. It has become equally desirable to prepare new forms of aluminum phosphate in order to broaden the fields of use for this compound, as well as to increase its efficiency and enhance its usefulness in known applications.

It is an object of this invention to provide a process for recovering aluminum phosphate in substantially pure form from variscite-strengite minerals containing the same. It is another object of this invention to provide a process for recovering aluminum phosphate as an essentially amorphous gel or in an essentially crystalline form from aluminum phosphate-containing minerals of the variscite-strengite series. Still another object of this invention is to provide a new gel form and a new crystal form of aluminum phosphate and methods for preparing the same. Further objects of this invention will become apparent to those skilled in the art in view of the more detailed description which follows.

It has been discovered that aluminum phosphate can be recovered from (1) ores of the variscite-strengite series by reacting the ores (2) with a saturated aqueous solution of sulfur dioxide under slight pressure for a sufficient period of time to dissolve at least a major proportion of the aluminum phosphate content of the ore, separating undissolved solids from the aluminum phosphate containing solution, and recovering aluminum phosphate from the said separated solution.

Aluminum phosphate minerals to which the above process is applicable are those of the variscite-strengite series. This series includes numerous minerals, such as those commonly called redondite, lucinite, scorrodite, barrandite, utahlite, chlorutahlite, sphaerite, and peganite. It is to be understood that any of these minerals and also any other similar naturally-occurring aluminum phosphate minerals can be treated in accordance with the teachings herein. In carrying out the process, the aluminum phosphate-containing mineral is reacted with an aqueous solution which is at all times maintained saturated or supersaturated with respect to $SO_2$. To accomplish this end, the dissolving reaction is carried out in a closed system maintained under pressures of from about 2 or 3 pounds per square inch gauge to about 40 or 50 pounds per square inch gauge.

The dissolving treatment can be commenced with an aqueous solution of sulfurous acid or by passing sulfur dioxide gas into an aqueous slurry containing the mineral to be treated. In either case, it will usually be found necessary to add sulfur dioxide gas to the system as treatment proceeds in order to maintain the $SO_2$ saturation.

Water may be used in any amount sufficient to retain in solution all of the aluminum phosphate dissolved by the treatment. Exact amounts of water used will thus depend upon the composition of the mineral to be treated and upon the amount of aluminum phosphate to be dissolved.

The dissolving treatment will proceed satisfactorily at ambient temperatures, e.g., about 20 to 25° centigrade. Treatment times can be reduced by using temperatures of up to about 90° centigrade but such temperatures also require substantial pressures in order to maintain the solution saturated with $SO_2$. Therefore it is usually preferred to operate at relatively low temperatures on the order of about 20 to about 40° centigrade.

The particle size of the aluminum phosphate-containing mineral is not critical. However, in order to reduce the time required to solubilize the desired amount of aluminum phosphate, it is generally desirable to grind the mineral to a size range of from about 5 to about 40 mesh (U.S. Standard). Heating the mineral, before or after grinding, to temperatures of about 150° centigrade to about 300° centigrade to remove the bound water which it contains also greatly reduces treatment time.

It is generally preferred to stir or otherwise agitate the aqueous slurry during the dissolving treatment to provide more intimate contact between the saturated $SO_2$ solution and the mineral solids.

After the desired amounts of aluminum phosphate have been dissolved by the $SO_2$ solution, the undissolved solids are separated. Separation can be accomplished in any conventional manner such as by filtration, decantation, centrifugation or the like. The separated solids contain substantially all of the silica or silicates present in the original mineral, as well as some undissolved phosphates. By properly choosing reaction temperatures, pressures and times, it is a simple matter to obtain in the separated solution a major proportion of the aluminum phosphate content of the previously named variscite minerals.

Aluminum phosphate can be recovered from sulfur dioxide solutions in a variety of ways. It has been found that novel products are produced by using one of the two new recovery methods described below. The first new method results in the novel aluminum phosphate gel of this invention while the second produces the novel aluminum phosphate crystals which are another object of this invention.

In accordance with one embodiment of the present invention novel aluminum phosphate gels are produced by heating an aqueous sulfur dioxide solution of aluminum phosphate to remove $SO_2$. The heating can be accomplished by sparging the solution with a hot gas such as air, steam, combustion gases, flue gases or the like; or simply by boiling the solution at atmospheric or subatmospheric pressures. Boiling at subatmospheric pressures produces a gel which has higher surface area and pore volume after activation.

Evolution of $SO_2$ from the solution in the manner described causes precipitation of aluminum phosphate in the form of a voluminous thixotropic gel. Chemical analysis of the gel varies with the dilution of the solution from which it is produced. Gels with higher aluminum content are produced from more dilute solutions. The $Al_2O_3$ to $P_2O_5$ weight ratio ranges from about 0.6 to about 1.1. Corresponding $Al_2O_3$ to $P_2O_5$ mole ratios are between about .85 and about 1.55. Free water is readily removed from the gels by drying under vacuum at temperatures of 65° to 95° centigrade for from about 3 hours to about 24 hours. The dried gels can be activated by calcination in air at temperatures of from about 150° to about 300° centigrade. Activated gels having an $Al_2O_3$ to $P_2O_5$ weight ratio of from about 0.65 to about 0.70 and an $Al_2O_3$ to $P_2O_5$ mole ratio of from about 0.9 to about 1.0 have been made from moderately concentrated aqueous sulfur dioxide solutions of aluminum phosphate while a gel having an $Al_2O_3$ to $P_2O_5$ mole ratio of about 1.4 (corresponding to a weight ratio of about 1.0) has been made from a dilute solution. The activated gels have surface areas ranging from about 110 to about 235 square meters per gram and pore volumes ranging from about 0.35 to about 0.75 cubic centimeter per gram, as determined by standard methods for measuring these physical properties. The gels are suitable for use as a bonding agent. Activated gels are useful as desiccants and are particularly effective at low relative humidities, e.g., from about 10% to about 30% relative humidity. The activated gels can also be used as catalysts for the reaction between alcohols and ammonia to produce amines or for hydrogenation of castor oil. Conditions, concentrations, etc. for these catalytic uses have been previously described in U.S. Patent 2,113,241 and British patent 317,391; respectively.

In accordance with the second embodiment for recovering aluminum phosphate from aqueous sulfur dioxide solutions, the solution is heated to a temperature between about 150° and about 225° centigrade while maintaining sufficient pressure to substantially preclude evolution of any water or $SO_2$. Heating is preferably conducted at temperatures between about 175° and about 200° centigrade, and in a closed vessel to give the required pressure. The solution after heating under pressure as described, is cooled to ambient temperatures and filtered to cover the precipitate thereby formed. This precipitate consists of fine crystals which when analyzed are found to contain from 41 to 43 percent by weight $Al_2O_3$ and correspondingly from 59 to 57 percent by weight $P_2O_5$. The mole ratio of $Al_2O_3$ to $P_2O_5$ is equal to about one. The X-ray diffraction pattern of these crystals is shown in Table I.

TABLE I.—CRYSTALLINE $AlPO_4$–X-RAY DIFFRACTION PATTERN

| Interplanar distance (Angstrom units): | Relative intensity, $I/I_0$ |
|---|---|
| 4.380 | 100 |
| 4.152 | 74 |
| 3.883 | 63 |
| 2.522 | 18 |
| 3.008 | 7 |
| 3.058 | 4 |
| 2.338 | 4 |
| 2.113 | 4 |
| 4.85 | 2 |
| 4.60 | 2 |
| 3.058 | 2 |
| 2.071 | 2 |

The new crystalline $AlPO_4$ is suitable for use in the same applications described hereinabove for the aluminum phosphate gels.

It should be noted at this point that the novel aluminum phosphate gels and aluminum phosphate crystals described above can be made from any aqueous sulfur dioxide solution of aluminum phosphate. Thus any aluminum phosphate containing material which will dissolve in saturated $SO_2$ solution could be used as the basic raw material. For example, it is possible to dissolve a pure aluminum phosphate such as $AlPO_4 \cdot 2H_2O$ (also known as variscite similarly as the minerals containing it) in a saturated aqueous solution of sulfur dioxide, and then recover aluminum phosphate gels or aluminum phosphate crystals by proceeding in the manner described above. Impure aluminum phosphates such as the aluminum phosphates such as the aluminum phosphate sludge produced in purification of wet process phosphoric acid (see e.g., Kirk-Othmer, "Encyclopedia for Chemical Technology," vol. 10 (1953), pp. 429–430) can also be converted to a very useful product by use of the process of this invention.

The invention will be further illustrated by the following non-limiting specific examples.

EXAMPLE 1

*Extraction of aluminum phosphate from a ferrian-variscite*

A ferrian-variscite ore from Mexico was dehydrated by heating for about two hours at 200° centigrade. Analysis of the original ore and the dehydrated ore was as follows:

| | Original (as received) | Dehydrated (2 hours) |
|---|---|---|
| $Al_2O_3$ | 24.5 | 30.8 |
| $Fe_2O_3$ | 3.9 | 4.3 |
| $P_2O_5$ | 36.6 | 47.9 |
| Volatiles at 200° C | 20.0 | Nil. |

The dehydrated ore was ground to pass through a 20 mesh screen and 100 grams of the ground ore was slurried in a solution containing 78 grams of sulfur dioxide in 300 milliliters of water. The slurry was placed under a pressure of about 10 pounds per square inch gauge and was continuously agitated for about one hour while maintaining a temperature of 21° centigrade. Undissolved solids were separated from the solution by centrifugation. Anlaysis of these solids showed that they contained virtually all of the silica and siliceous gangue present in the ore treated, together with about one-half of the iron. Substantially all of the aluminum phosphate had passed into solution together with the other half of the iron phosphate originally present in the ore. The solution was quite clear.

EXAMPLE 2

*Preparation of aluminum phosphate gel*

A clear, aqueous solution of aluminum phosphate and sulfur dioxide prepared as described in Example 1 was placed on a steam bath and boiled to evolve sulfur dioxide. A voluminous thixotropic gel was formed. The gel was dried at about 90° centigrade and then activated by calcining at 200° centigrade for about two hours. Analysis after drying and activation showed that the $Al_2O_3$ to $P_2O_5$ mole ratio was 0.91. The activated gel was useful as a desiccant. It was a particularly good water adsorbent at 10% and 20% relative humidity.

EXAMPLE 3

*Preparation of crystalline aluminum phosphate*

An aqueous solution of aluminum phosphate and sulfur dioxide was prepared in the same manner as described in Example 1. The solution was placed in a closed container and heated under pressure to 180° centigrade. The container and contents were cooled and it was found that a fine crystalline precipitate had been formed. The precipitate was filtered out of the mother liquor, washed, and dried. Analysis showed that the recovered crystals contained 41.1 percent by weight $Al_2O_3$ and 57.2 percent by weight $P_2O_5$ together with minor amounts of $Fe_2O_3$ and water. The calculated mole ratio of $Al_2O_3$ to $P_2O_5$ indicates that the crystalline compound has the empirical formula $AlPO_4$. X-ray diffraction pattern analyses were performed on the recovered crystals using CuK alpha radiation; and the results were exactly the same as those shown in Table I above.

These $AlPO_4$ crystals were ideally suited for use as catalysts in known reaction systems, and as a bonding agent.

EXAMPLE 4

Another variscite ore was dehydrated by heating for 5 hours at temperatures of about 190° to 196° centigrade. The dehydrated ore analyzed 20.3% $P_2O_5$, 22.37% $Al_2O_3$ and 2.67% $Fe_2O_3$. The dehydrated ore was ground to pass through a 20 mesh screen. A slurry containing 200 grams of the ground ore in 1200 milliliters of water was prepared and placed in a closed container. Sulfur dioxide gas was bubbled into the slurry at a rate of 5 grams per minute for 30 minutes while the system was maintained under a pressure of 250 millimeters of mercury (about 5 pounds per square inch gauge). After $SO_2$ addition was completed the reaction mixture was maintained at the stated pressure for an additional 30 minutes after which it was centrifuged for 10 minutes to segregate undissolved solids. The solids were then filtered out of the solution. The filter cake (designated sample 4C for convenience) was kept for further treatment, described below. The solution was again placed under a positive pressure of 250 millimeters of mercury and $SO_2$ gas was bubbled in at 5 grams per minute for 15 minutes to insure complete solubilization of any possible suspended solids. No undissolved residue was obtained upon a second filtration of the thus treated solution.

The major portion of the solution was boiled on a steam bath to evolve sulfur dioxide. After a short time a thick voluminous gel precipitated. The gel was filtered out of the remaining liquor, washed with water, again filtered and then vacuum dried at 65° centigrade overnight (about 16 hours). The dried gel was activated by calcination for 4 hours at 200° centigrade. The activated gel weighed 54.9 grams. It was designated as sample 4A. A second gel prepared in exactly the same manner except that it was washed twice with water (instead of once) before drying and activation, was designated as sample 4E.

A second smaller portion of the aqueous sulfur dioxide solution was boiled at temperatures of from about 65° to 70° centigrade by applying a vacuum thereto. A voluminous gel again formed as the sulfur dioxide was evolved under these conditions. The vacuum-gelled sample was dried over magnesium perchlorate in a vacuum desiccator for about 16 hours (overnight), slurried in water, refiltered, again vacuum dried overnight and then activated by calcining for 4 hours at 200° centigrade. This gel, weighing 18.5 grams, was designated sample 4B.

The filter cake (sample 4C described above) was washed with water and drained dry on a vacuum filter. The filtrate and the wash liquors were combined, thus giving a sulfurous acid solution of aluminum phosphate similar to the main solution from which gels 4A and 4B were prepared, but much more dilute (because of the wash waters). The dilute solution was boiled under vacuum at temperatures of 65° to 70° centigrade to evolve $SO_2$. The gel which precipitated was dried and activated in the same manner as sample 4B except that acetone (instead of water) was used as the gel washing liquid. The dried and activated gel was designated sample 4D.

The chemical and physical properties of the gels 4A, 4B, 4D and 4E were determined. Results are shown in Table II.

TABLE II.—ALUMINUM PHOSPHATE GELS FROM AQUEOUS SULFUR DIOXIDE SOLUTIONS

| Chemical analysis | 4A | 4B | 4D | 4E |
|---|---|---|---|---|
| Percent by Weight: | | | | |
| Aluminum as $Al_2O_3$ | 35.14 | 34.08 | 34.25 | 35.32 |
| Phosphate as $P_2O_5$ | 50.60 | 50.50 | 34.50 | 50.90 |
| Iron as $Fe_2O_3$ | 2.66 | 2.36 | 3.59 | 2.05 |
| Physical properties: | | | | |
| Surface area (square meters per gram) | 120 | 228 | 218 | 159 |
| Pore volume (cubic centimeters per gram) | .40 | .72 | .64 | .57 |
| Water adsorption (grams per 100 grams) at— | | | | |
| 10% relative humidity | 4.89 | | | 5.12 |
| 20% relative humidity | 7.99 | | | 8.06 |

What is claimed is:

1. Aluminum phosphate crystals having an $Al_2O_3$ to $P_2O_5$ mole ratio of about one and characterized by the following X-ray diffraction pattern:

| Interplanar distance (Angstrom units): | Relative intensity, $I/I_0$ |
|---|---|
| 4.380 | 100 |
| 4.152 | 74 |
| 3.883 | 63 |
| 2.522 | 18 |
| 3.008 | 7 |
| 3.058 | 4 |
| 2.338 | 4 |
| 2.113 | 4 |
| 4.85 | 2 |
| 4.60 | 2 |
| 3.058 | 2 |
| 2.071 | 2 |

2. Aluminum phosphate crystals containing from about 41 to about 43 percent by weight of $Al_2O_3$ and from 59 to about 57 percent by weight of $P_2O_5$, having an $Al_2O_3$ to $P_2O_5$ mole ratio of about one, and characterized by the following X-ray diffraction pattern:

| Interplanar distance (Angstrom units): | Relative intensity, $I/I_0$ |
|---|---|
| 4.380 | 100 |
| 4.152 | 74 |
| 3.883 | 63 |
| 2.522 | 18 |
| 3.008 | 7 |
| 3.058 | 4 |
| 2.338 | 4 |
| 2.113 | 4 |
| 4.85 | 2 |
| 4.60 | 2 |
| 3.058 | 2 |
| 2.071 | 2 |

References Cited by the Examiner

UNITED STATES PATENTS 2,924,509  2/1960  Huber et al. _____ 23—105

(Other references on following page)

FOREIGN PATENTS

| | | |
|---|---|---|
| 941,078 | 6/1948 | France. |
| 1,218,951 | 12/1959 | France. |
| 1,036,230 | 8/1958 | Germany. |
| 1,058,480 | 6/1959 | Germany. |
| 1,058,481 | 6/1959 | Germany. |

OTHER REFERENCES

Kochetkov: "Preparation of the Phosphate Extracted by Sulfurous Acid from Viatka Phosphate," Chem. Abstracts, volume 10, page 1246 [ACJ, 1916].

Lundell et al.: Applied Inorganic Analysis, John Wiley and Sons, Inc., N.Y., 1953, page 391.

Mellor: "Comprehensive Treatise on Inorg. and Theoret. Chem.," volume 5, pages 362–366 [Longmans, Green & Co., London, 1924].

Pascal: Nouveau Traité de Chimie Minerale, volume 6, page 637 [Masson et Cie, Paris].

Waggaman, W. H.: Phosphoric Acid, Phosphates, and Phosphatic Fertilizers, Reinhold, N.Y., 1952, pages 36–37.

BENJAMIN HENKIN, *Primary Examiner.*

MAURICE A. BRINDISI, *Examiner.*